Patented Nov. 22, 1932

1,888,516

UNITED STATES PATENT OFFICE

FRITZ STRAUB, WALTER ANDERAU, AND HANS MAYER, OF BASEL, SWITZERLAND, ASSIGNORS TO SOCIETY OF CHEMICAL INDUSTRY IN BASLE, OF BASEL, SWITZERLAND

AZO-DYESTUFFS CONTAINING CHROMIUM AND PROCESS OF MAKING SAME

No Drawing. Application filed April 11, 1928, Serial No. 269,293, and in Switzerland April 23, 1927.

The present invention relates to new dyestuffs containing chromium. It comprises the new azo-dyestuffs, the process of making same, and the material dyed with the new dyestuffs.

It has been found that new valuable dyestuffs are obtained by treating with agents yielding chromium such as o-hydroxy-azo-dyestuffs which are obtained by uniting diazotized 2-amino-1-hydroxybenzene of the general formula

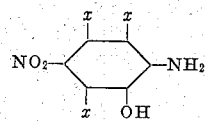

wherein $x$ means hydrogen or its substituents, such as halogen, or sulfo-groups, with compounds of the general formula

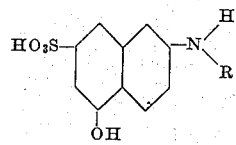

wherein R means hydrogen, alkyl, aralkyl, aryl, alkylene, arylene or acidyl. Such compounds are for instance the N-methyl, N-ethyl, N-phenyl, N-benzyl, N-anisidyl, N-phenetidyl, N-cresidyl, N-salicylic acid derivatives of the 2-amino-5-hydroxynaphthaline-7-sulfonic acid, further the 2:2'-dinaphthylamine-5:5'-dihydroxy-7:7'-disulfonic acid, and the products which are obtained by condensing primary diamines with one or two molecular proportions of 2-amino-5-hydroxynaphthaline-7-sulfonic acid. Among the acidyl compounds those derivatives of the 2-amino-5-hydroxy-naphthaline-7-sulfonic acid are inter alia coming into consideration which are derived from formic acid, carbonic acid, acetic acid, and other fatty acids, from aryl-carbonic acids, such as benzoic acid, nitrobenzoic acids, phthalic acids, from oxalic acid, aryl-sulfuric acids, or from acids of the heterocyclic series, such as cyanuric acid, in which connection it may be remarked that polybasic acids may be united with one or several molecules of 2-amino-5-hydroxynaphthaline-7-sulfonic acid. As further acidyl derivatives there may further be mentioned the products which are obtained by treating the 2-amino-5-hydroxy-naphthaline-7-sulfonic acid with aromatic nitro-compounds, such as nitrobenzoyl-chloride, reducing the condensation products so obtained, and condensing same further with compounds which may react with substances containing amino groups. Compounds of these different species are described in great number in the patent literature.

Particularly suitable as agents yielding chromium are derivatives of the trivalent chromium, such as chromium hydroxide, chromium oxide, and the salts which are formed from these compounds with acids.

The products thus obtained are dyestuffs which may be employed for the dyeing of fibers of animal, vegetable and artificial origin, such as wool, silk, cotton, viscose; further for the manufacture of dyed varnishes. These dyestuffs form dark colored powders which are soluble in water and dilute alkalies to blue to green-blue and blue-grey solutions. They are particularly suitable for the production of blue dyeings fast to light.

The following examples illustrate the invention:—

Example 1

63 parts of the sodium salt of the dyestuff of the formula

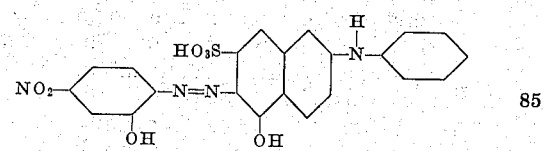

from 5-nitro-2-aminophenol and 2-phenyl-amino-5-naphthol-7-sulfonic acid (coupled under alkaline conditions) are dissolved in 3200 parts of hot water, the solution is neutralized and then mixed with 15.6 parts of $Cr_2O_3$ in the form of a solution of chromium fluoride of 7.8 per cent. of strength; the whole is then boiled in a reflux apparatus for 24 to 30 hours. After cooling, the dyestuff formed separates in greater part; by addition of common salt the separation is completed. The isolated dyestuff is a blackish powder which dissolves in water to a pure blue solution; in caustic soda solution of 10 per cent. strength to a greenish blue solution; in concentrated sulfuric acid to a blue violet solution. It dyes cotton in a neutral bath containing Glaubers salt blue tints having good properties of fastness.

*Example 2*

49.7 parts of the dyestuff of the formula

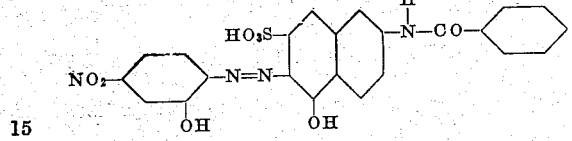

obtained by coupling diazotized 5-nitro-2-amino-phenol with 2-benzoyl-amino-5-naphthol-7-sulfonic acid (coupled under alkaline conditions) are dissolved in 6000 parts of boiling water, and the solution is boiled for a long time in the reflux appartus with 15.2 parts of $Cr_2O_3$ in the form of chromium fluoride. The chromium compound of the dyestuff is thus precipitated. It is filtered and washed.

When it is dry it is a dark powder which dissolves somewhat sparingly in water but easily in dilute sodium carbonate solution to a greenish blue solution. It dyes cotton fast grey-blue tints in a solution alkaline with sodium carbonate.

*Example 3*

46.1 parts by weight of the dyestuff of the formula

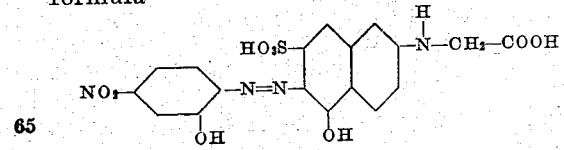

obtained by coupling diazotized 5-nitro-2-amino-1-hydroxybenzene with the condensation product from 2-amino-5-hydroxynaphthaline-7-sulfonic acid and chloro-acetic acid, are boiled for 24 hours in the reflux apparatus in 800 parts of water with double the theoretical amount of $Cr_2O_3$ in the form of chromium fluoride. By the addition of common salt the chromium complex which has been formed is separated and dried at moderate temperature. It forms a dark blue powder which is easily soluble in water to a pure blue solution, dyeing wool and cotton blue tints.

The following table shows the shades on cotton or viscose obtained with some of the combinations according to the present invention:

| Diazotizing component | Coupling component | Shade of the direct dyeings of the chromium compound |
|---|---|---|
| I. 5-nitro-2-aminophenol | 2-amino-5-hydroxynaphthaline-7-sulfonic acid | Pure green-blue |
| II. 5-nitro-2-aminophenol | 2-methylamino-5-hydroxynaphthaline-7-sulfonic acid | Pure green-blue |
| III. 5-nitro-2-aminophenol | 2-benzylamino-5-hydroxynaphthaline-7-sulfonic acid | Pure green-blue |
| IV. 5-nitro-2-aminophenol | 2-phenylamino-5-hydroxynaphthaline-7-sulfonic acid | Pure green-blue |
| V. 5-nitro-2-aminophenol | 2-p-phenetidino-5-hydroxynaphthaline-7-sulfonic acid | Pure green-blue |
| VI. 5-nitro-2-aminophenol | 2-o-anisidino-5-hydroxynaphthaline-7-sulfonic acid | Pure green-blue |
| VII. 5-nitro-2-aminophenol | 1-(2'-methoxy-4'-methyl)-phenylamino-5-hydroxynaphthaline-7-sulfonic acid | Pure green-blue |
| VIII. 4-chloro-5-nitro-2-aminophenol | 1-(2'-methoxy-4'-methyl)-phenylamino-5-hydroxynaphthaline-7-sulfonic acid | Pure green-blue |
| IX. 5-nitro-2-aminophenol-4-sulfonic acid | 2-phenylamino-5-hydroxynaphthaline-7-sulfonic acid | Pure green-blue |
| X. 5-nitro-4-chloro-2-aminophenol-6-sulfonic acid | 2-phenylamino-5-hydroxynaphthaline-7-sulfonic acid | Pure green-blue |
| XI. 5-nitro-2-aminophenol | 2-benzoylamino-5-hydroxynaphthaline-7-sulfonic acid | Grey-blue |
| XII. 5-nitro-2-aminophenol | 2-(3'-amino-)-benzoylamino-5-hydroxynaphthaline-7-sulfonic acid | Grey-blue |
| XIII. 5-nitro-2-aminophenol | 2-(3'-nitro-)-benzoylamino-5-hydroxynaphthaline-7-sulfonic acid | Grey-blue |
| XIV. 5-nitro-2-aminophenol | 2-(4'-hydroxy-3'-carbonic acid)-phenyl-5-hydroxynaphthaline-7-sulfonic acid | Blue |
| XV. 5-nitro-2-aminophenol | 2-acetylamino-5-hydroxynaphthaline-7-sulfonic acid | Blue-grey |
| XVI. 2 mols 5-nitro-2-aminophenol | 5:5'-dihydroxy-7:7'-disulfonic acid-2:2'-dinaphthyl urea | Blue-grey |
| XVII. 5-nitro-2-aminophenol | 2-p-toluene-sulfamino-5-hydroxynaphthaline-7-sulfonic acid | Blue-grey |
| XVIII. 5-nitro-2-aminophenol | 2-(2'-4'-dinitro-)-phenylamino-5-hydroxynaphthaline-7-sulfonic acid | Blue-grey |
| XIX. 2 mols 5-nitro-2-aminophenol | 2:2'-aminodinaphthyl-5:5'-dihydroxy-7:7'-disulfonic acid | Blue |
| XX. 5-nitro-2-aminophenol | 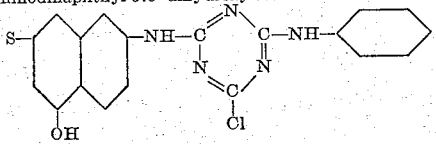 | Blue |

The formula of the dyestuff No. V is:

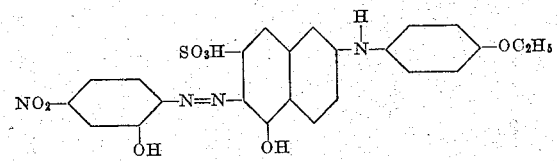

The formula of the dyestuff No. VII is:

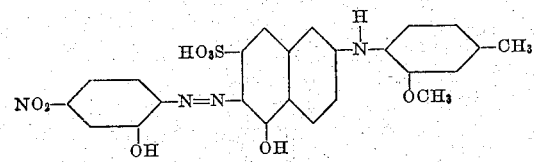

The formula of the dyestuff No. XIV is:

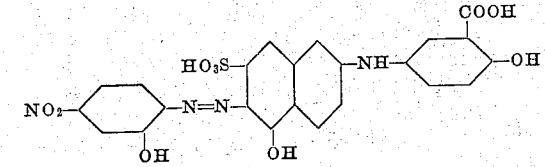

The formula of the dyestuff No. XVII is:

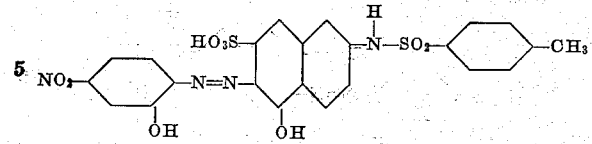

The formula of the dyestuff No. XVIII is:

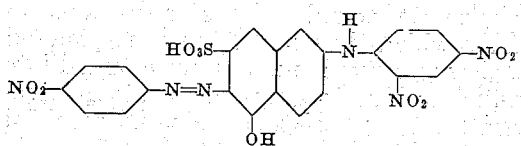

The manner in which the chromium is linked in the dystuff is unknown.

What we claim is:—

1. Process for the manufacture of dyestuffs containing chromium, consisting in treating the herein described o-hydroxy-azo-dyestuffs of the general formula

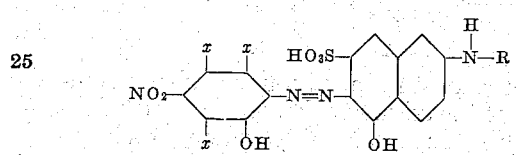

wherein $x$ means hydrogen or halogen or sulfo groups, and R alkyl, alkylene, benzyl, phenyl, naphthyl, phenylene or an acidyl radicle of the aliphatic or of the benzene series, with compounds of the trivalent chromium.

2. Process for the manufacture of dyestuffs containing chromium, consisting in treating the herein described o-hydroxy-azo-dyestuffs of the general formula

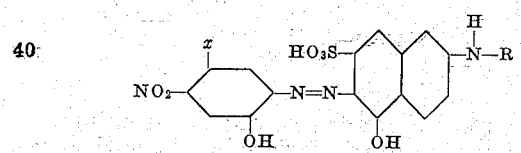

wherein $x$ means hydrogen or halogen, and R alkyl, alkylene, benzyl, phenyl, naphthyl, phenylene or an acidyl radicle of the aliphatic or of the benzene series, with compounds of the trivalent chromium.

3. Process for the manufacture of dyestuffs containing chromium, consisting in treating the herein described o-hydroxy-azo-dyestuffs of the general formula

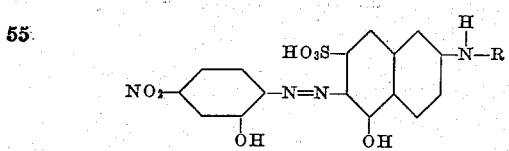

wherein R means alkyl, alkylene, benzyl, phenyl, naphthyl, phenylene or an acidyl radicle of the aliphatic or of the benzene series, with compounds of the trivalent chromium.

4. Process for the manufacture of dyestuffs containing chromium, consisting in treating the herein described o-hydroxy-azo-dyestuffs of the general formula

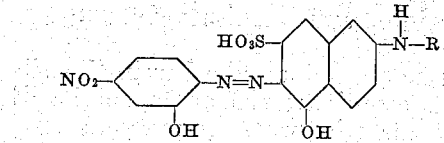

wherein R means a radicle which contains a benzene or naphthalene nucleus, with compounds of the trivalent chromium.

5. Process for the manufacture of dyestuffs containing chromium, consisting in treating the herein described o-hydroxy-azo-dyestuffs of the general formula

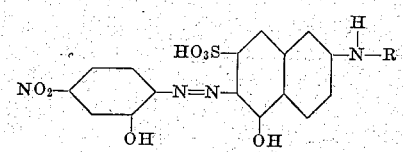

wherein R means a phenyl or naphthyl radicle, with compounds of the trivalent chromium.

6. Process for the manufacture of dyestuffs containing chromium, consisting in treating the herein described o-hydroxy-azo-dyestuffs of the general formula

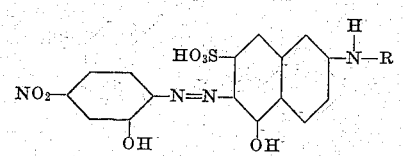

wherein R means a phenyl radicle, with compounds of the trivalent chromium.

7. Process for the manufacture of dyestuffs containing chromium, consisting in treating the herein described o-hydroxy-azo-dyestuff of the formula

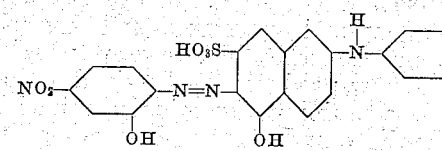

with compounds of the trivalent chromium.

8. As new products the herein described dyestuffs containing chromium obtained by treating the o-hydroxy-azo-dyestuffs of the general formula

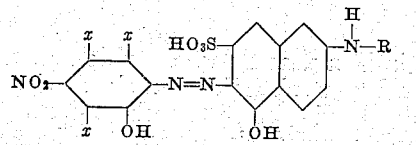

wherein $x$ means hydrogen or halogen or sulfo groups, and R alkyl, alkylene, benzyl, phenyl, naphthyl, phenylene or an acidyl radicle of the aliphatic or of the benzene series with compounds of the trivalent chromium, which dyestuffs form dark colored powders which are soluble in water and dilute alkalies to blue to grey-blue solutions, dyeing fibers of animal, vegetable and artificial origin, and varnishes, blue to grey tints.

9. As new products the herein described dyestuffs containing chromium obtained by treating the o-hydroxy-azo-dyestuffs of the general formula

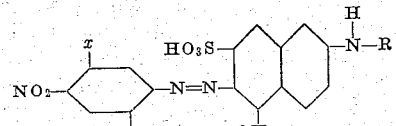

wherein $x$ means hydrogen or halogen, and R alkyl, alkylene, benzyl, phenyl, naphthyl, phenylene or an acidyl radicle of the aliphatic or of the benzene series with compounds of the trivalent chromium, which dyestuffs form dark colored powders which are soluble in water and dilute alkalies to blue to grey-blue solutions, dyeing fibers of animal, vegetable and artificial origin, and varnishes, blue to grey tints.

10. As new products the herein described dyestuffs containing chromium obtained by treating the o-hydroxy-azo-dyestuffs of the general formula

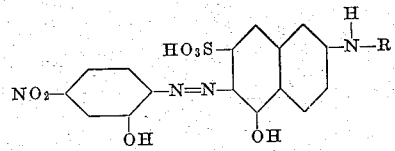

wherein R means alkyl, alkylene, benzyl, phenyl, naphthyl, phenylene or an acidyl radicle of the aliphatic or of the benzene series with compounds of the trivalent chromium, which dyestuffs form dark colored powders which are soluble in water and dilute alkalies to blue to grey-blue solutions, dyeing fibers of animal, vegetable and artificial origin, and varnishes, blue to grey tints.

11. As new products the herein described dyestuffs containing chromium obtained by treating the o-hydroxy-azo-dyestuffs of the general formula

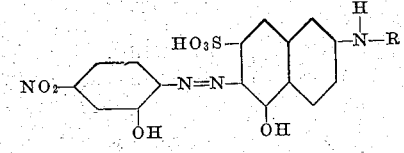

wherein R means a radicle which contains a benzene or naphthalene nucleus with compounds of the trivalent chromium, which dyestuffs form dark colored powders which are soluble in water and dilute alkalies to blue to grey-blue solutions, dyeing fibers of animals, vegetable and artificial origin, and varnishes, blue to grey tints.

12. As new products the herein described dyestuffs containing chromium obtained by treating the o-hydroxy-azo-dyestuffs of the general formula

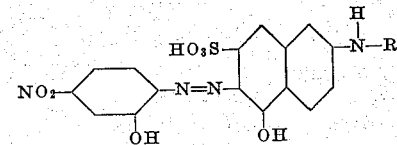

wherein R means a phenyl or naphthyl radicle with compounds of the trivalent chromium, which dyestuffs form dark colored powders which are soluble in water and dilute alkalies to blue to grey-blue solutions, dyeing fibers of animal, vegetable and artificial origin, and varnishes, blue to grey tints.

13. As new products the herein described dyestuffs containing chromium obtained by treating the o-hydroxy-azo-dyestuffs of the general formula

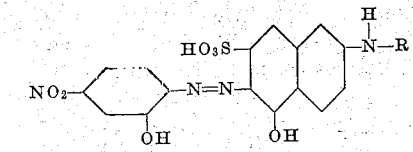

wherein R means a phenyl nucleus with compounds of the trivalent chromium, which dyestuffs form dark colored powders which are soluble in water and dilute alkalies to blue to grey-blue solutions, dyeing fibers of animal, vegetable and artificial origin, and varnishes, blue to grey tints.

14. As new products the herein described dyestuffs containing chromium obtained by treating the o-hydroxy-azo-dyestuffs of the formula

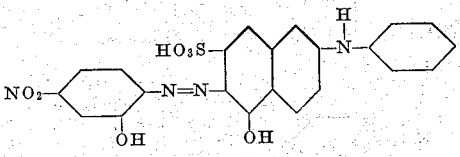

with compounds of the trivalent chromium which dyestuffs form dark colored powders which are soluble in water and dilute alkalies to blue solutions, dyeing fibers of animal, vegetable and artificial origin, and varnishes, blue tints.

In witness wherof we have hereunto signed our names this 31st day of March 1928.

FRITZ STRAUB.
WALTER ANDERAU.
HANS MAYER.